United States Patent
Ryu et al.

(10) Patent No.: US 8,681,227 B2
(45) Date of Patent: Mar. 25, 2014

(54) PHOTOGRAPHY DEVICE HAVING ANTI-SHAKE FUNCTION

(75) Inventors: Jae-Wook Ryu, Ansan kyeonngi-do (KR); He-Won Jung, Ansan kyeonngi-do (KR); Hye-Kyoung Ji, Ansan-si (KR)

(73) Assignee: Hysonic. Co., Ltd. (KR)

( * ) Notice: Subject to any disclaimer, the term of this patent is extended or adjusted under 35 U.S.C. 154(b) by 545 days.

(21) Appl. No.: 12/992,418

(22) PCT Filed: Mar. 31, 2009

(86) PCT No.: PCT/KR2009/001644
§ 371 (c)(1),
(2), (4) Date: Dec. 21, 2010

(87) PCT Pub. No.: WO2009/139543
PCT Pub. Date: Nov. 19, 2009

(65) Prior Publication Data
US 2011/0096178 A1 Apr. 28, 2011

(30) Foreign Application Priority Data

| May 14, 2008 | (KR) | 10-2008-0044348 |
| Oct. 15, 2008 | (KR) | 10-2008-0101010 |
| Dec. 17, 2008 | (KR) | 10-2008-0128375 |
| Mar. 20, 2009 | (KR) | 10-2009-0023717 |
| Mar. 20, 2009 | (KR) | 10-2009-0023718 |

(51) Int. Cl.
*H04N 5/228* (2006.01)

(52) U.S. Cl.
USPC .................................. 348/208.2; 348/46

(58) Field of Classification Search
USPC .................................. 348/46, 208.2
See application file for complete search history.

(56) References Cited

U.S. PATENT DOCUMENTS

| 5,266,988 A | 11/1993 | Washisu | |
| 2007/0154198 A1* | 7/2007 | Oh et al. | 396/85 |

FOREIGN PATENT DOCUMENTS

| JP | 1999-013837 | 4/1999 |
| KR | 10-2007-0120260 | 12/2007 |

OTHER PUBLICATIONS

International Search Report—PCT/KR2009/001644 dated May 29, 2009.

* cited by examiner

*Primary Examiner* — Usman Khan
(74) *Attorney, Agent, or Firm* — Cantor Colburn LLP (57) ABSTRACT

The present invention is for sensing camera shake and moving a lens toward a direction to correct the camera shake when photographing an object so that the object may be clearly photographed. A coil and a magnet are included in the invention, and the coil moves in a direction perpendicular to the optical-axis of the lens as a result of magnetic fields generated by the magnet and the coil when electric power is applied to the coil.

6 Claims, 6 Drawing Sheets

PHOTOGRAPHY DEVICE HAVING ANTI-SHAKE FUNCTION

TECHNICAL FIELD

The present invention relates to a photography device with anti-shake function, and more particularly, to a photography device which senses shake of the photography device and moves lens in a direction correcting the shake to thereby allow an object to be clearly photographed.

BACKGROUND ART

In recent, compact electronic devices including a communication device such as a cellular phone are equipped with a compact photography device for photographing an image. These photography devices are characterized by compact and simple structure.

These photography devices includes a lens group consisting of a plurality of lenses and an image pickup device which converts optical signals transmitted through the lens group into electric signals.

However, when a user's hand grasping the electronic device equipped with the photography device is shaken or vibration is transferred to the electronic device by another external factor, the vibration is transferred to the photography device and thus the image of an object is blurred.

A support is required to photograph a clear image Due to this problem, but is hardly used since it is uncomfortable to be carried.

Therefore, deterioration in an image due to shake is inevitable for the general photography device for electronic devices.

DISCLOSURE

Technical Problem

Embodiments of the present invention are directed to a photography device which senses shake of the photography device upon photographing of an object and moves lens in a direction correcting the shake to thereby allow the object to be clearly photographed.

Technical Solution

In one embodiment, a photography device with anti-shake function includes: a housing; a holder mounted horizontally movably to the housing; a lens unit mounted up and down movably in an inside of the holder and including a lens therein; a first coil member mounted in an outside of the lens unit; a second coil member mounted to the holder; a magnet mounted to a side surface of the housing; and an iron piece member having one end which is in contact with the magnet and the other end which is disposed adjacently to the first coil member, wherein the lens unit moves up and down by interaction of a magnetic field generated by the magnet and induced via the iron piece member with a first electromagnetic field generated when power is applied to the first coil member, and the holder moves horizontally by interaction of the magnetic field generated by the magnet and induced via the iron piece member with a second electromagnetic field generated when power is applied to the second coil member.

The first coil member is wound on an outer circumferential surface of the lens unit with respect to an optical axis of the lens, the second coil member is wound in a hollowed cylindrical shape and mounted on an outer circumferential surface of the holder, and the iron piece member penetrates the second coil member.

The holder includes a through hole penetratively formed in a side surface of the holder so that an inside and outside of the holder communicates with each other; and a fixation projection projecting towards the magnet from both sides of the through hole, wherein the second coil member is inserted on the fixation projection and the iron piece member passes through the second coil member between the fixation projections and is penetratively inserted in the through hole.

The magnet is mounted to upper and lower ends of the iron piece member, respectively, and the polarities on sides in contact with the iron piece are the same.

The photography device further includes: a first elastic member mounted to the lens unit to elastically support the lens unit in an up and down direction and electrically connected with the first coil member; and a power terminal connected with the first elastic member to transfer power to the first coil member via the first elastic member, wherein the power terminal includes a first extension part formed parallel to an outer surface of the holder; and a second extension unit bent from the first extension part.

The photography device further includes: a second elastic member having one end mounted to the housing and the other end mounted to the holder to elastically support the holder in a horizontal direction, wherein the second elastic member is connected with the second coil member to transfer the power to the second coil member.

The second coil member is provided in plural such that a pair of the second coil members is mounted on the outer surface of the holder facing with each other, and the second elastic member is provided in plural such that the second elastic member applies the same power to the pair of facing second coil members.

Advantageous Effects

The photography device with anti-shake function of the present invention can move the lens in a direction correcting shake when the shake is generated upon photographing of an object to thereby allow the object to be clearly photographed.

DESCRIPTION OF DRAWINGS

The above and other objects, features and advantages of the present invention will become apparent from the following description of preferred embodiments given in conjunction with the accompanying drawings, in which.

BEST MODE

Hereinafter, an embodiment of the present invention will be described.

Figure 1:
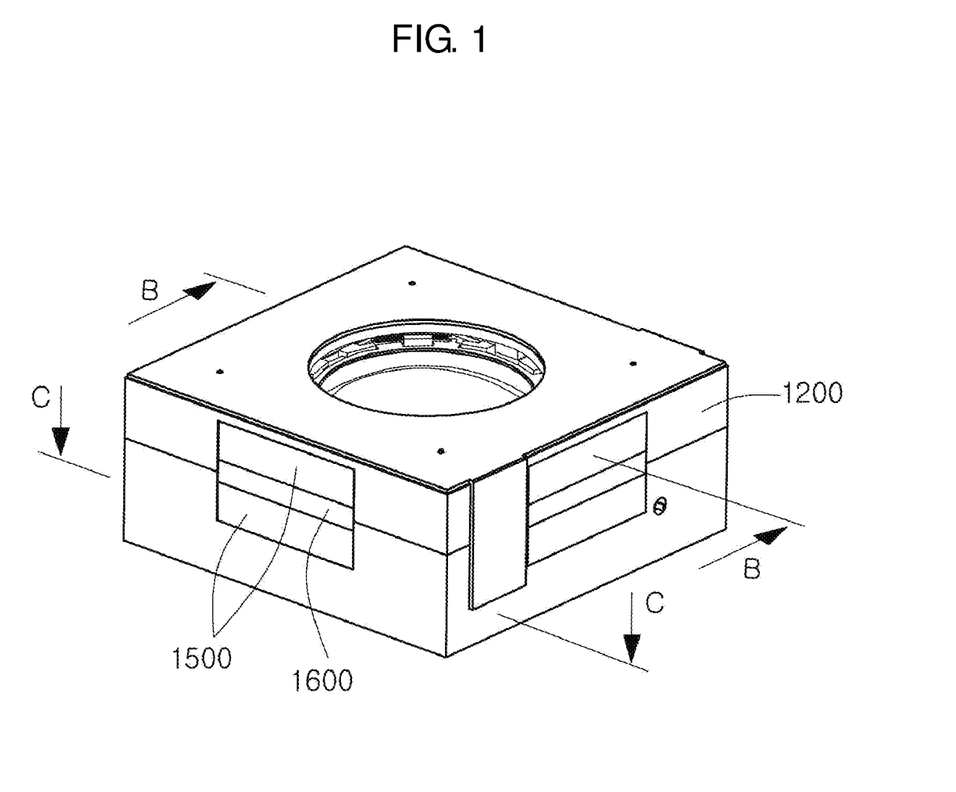
FIG. 1 is a perspective view illustrating a photography device with anti-shake function in accordance with an embodiment of the present invention.
Figure 2:
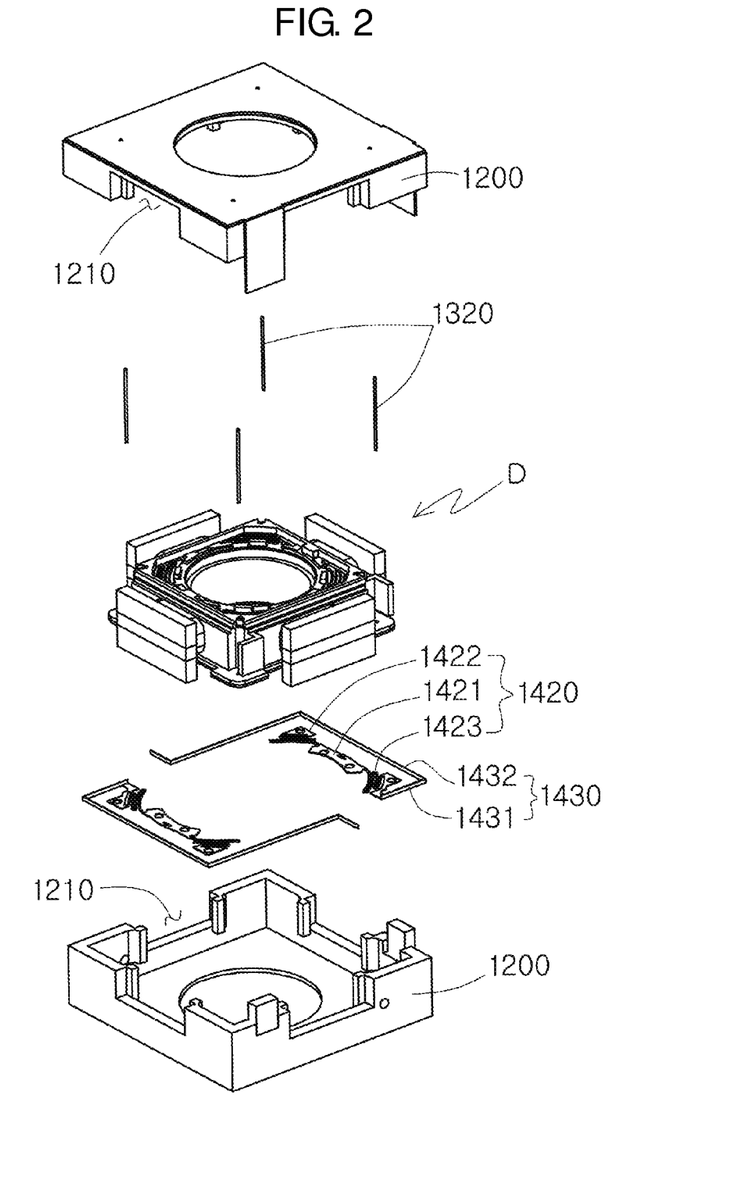
FIG. 2 is an exploded perspective view illustrating the photography device of FIG. 1.

FIG. 1 is a perspective view illustrating a photography device with anti-shake function in accordance with an embodiment of the present invention; FIG. 2 is an exploded perspective view illustrating the photography device of FIG. 1; and FIG. 3 is a partially enlarged exploded perspective view of 'D' in FIG. 2.

Figure 3:
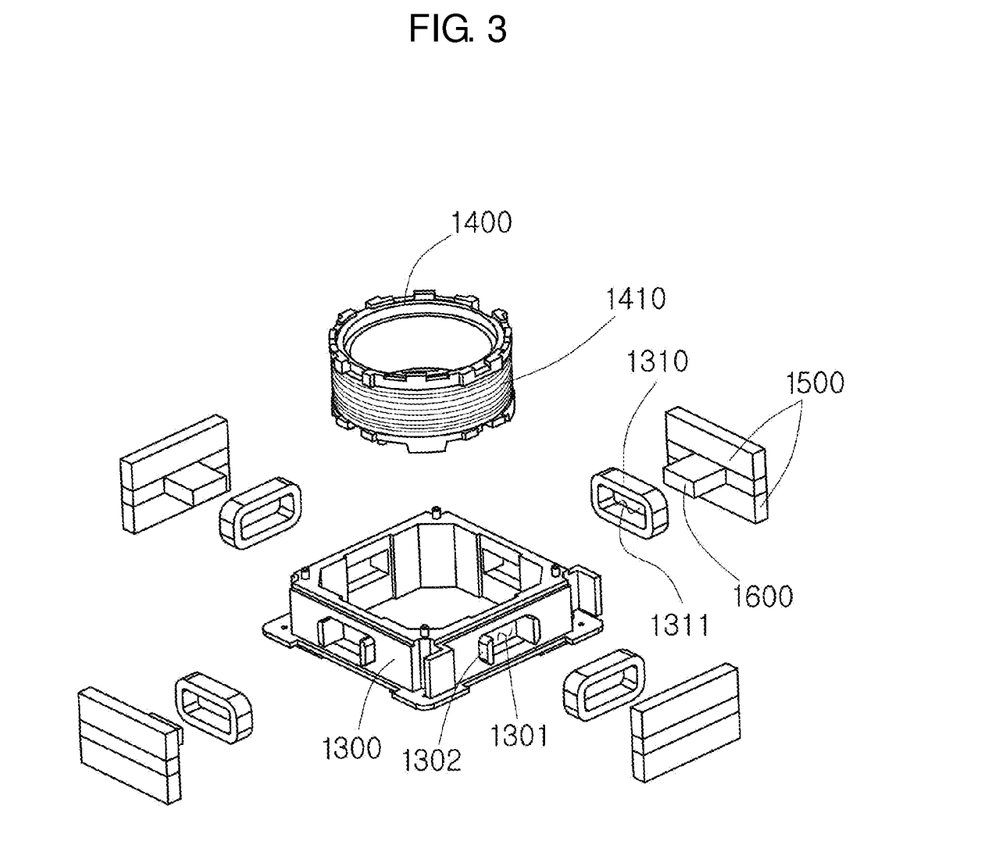
FIG. 3 is a partially enlarged exploded perspective view of 'D' in FIG. 2.

As illustrated in FIGS. 1 to 3, the photography device of the embodiment includes a housing 1200, a holder 1300, a lens unit 1400, a first coil member 1410, a second coil member 1310, a magnet 1500, a iron piece member 1600, a first elastic member 1420, a power terminal 1430 and a second elastic member 1320.

The housing 1200 has a rectangular shape and is formed separately into an upper part and a lower part, of which edges projects toward each other to enclose the holder 1300.

The holder 1300 has a hollowed rectangular shape and mounted movably in a horizontal direction in an inside of the housing 1200.

A side surface of the holder 1300 is formed with a through hole 1301 opened to communicate the inside and the outside of the holder 1300.

The through hole 1301 has a rectangular shape, and is formed on each of four side surfaces of the holder 1300.

Also, both sides of the through hole 1301 are formed with a fixing projection 1302 projecting toward the magnet 1500, respectively.

In the inside of this holder 1300, the lens unit 1400 is mounted movably in the up and down direction.

The lens unit 1400 has a hollowed cylindrical shape, and a plurality lenses (not shown) for adjusting the magnification of an object is mounted in the inside of the lens unit 1400.

Also, the outer peripheral surface of the lens unit 1400 is mounted with the first coil member 1410.

The first coil member 1410 is one made by winding a thin wire flowing current through the inside thereof around the outer peripheral surface of the lens unit 1400.

That is, the first coil member 1410 surrounds the outer peripheral surface of the lens unit 1400 in a direction rotating around the optical axis of the lens.

This first coil member 1410 forms a first electromagnetic field (not shown) in the vicinity thereof to move the lens unit 1400 up and down when the power is applied.

Meanwhile, the outer surface of the holder 1300 is mounted with the second coil member 1310.

The second coil member 1310 is one made by winding a thin wire flowing current through the inside thereof parallel to the outer surface of the holder 1300, and is formed in a hollowed cylindrical shape.

Also, the second coil member 1310 is mounted on the outer surface of the holder 1300 such that a pair of the second coil members 1310 is opposite to each other.

That is, two second coil members 1310 are respectively disposed on the opposite outer surfaces of the holder 1300 to form a pair, and total two pairs of the second coil members 1310 are mounted on the outer surface of the holder 1300.

Also, the second coil member 1310 is inserted around the fixing projection 1302 formed on the outer surface of the holder 1300.

That is, two fixing projections 1302 formed at both sides of the through hole 1301 is inserted in a hollow part 1311 penetratively formed in the center of the second coil member 1310 so that the hollow part 1311 of the second coil member 1310 is communicated with the through hole 1301.

This second coil member 1310 forms a second electromagnetic field (not shown) in the vicinity thereof to move the lens unit 1300 horizontally when the power is applied.

Meanwhile, the magnet 1500 is mounted on the side surface of the housing 1200 and disposed adjacently to the second coil member 1310.

The magnet 1500 has a rectangular shape and is two-pole magnetized in up and down direction, and total 8 magnets are mounted on the side surface of the housing, two on each side surface.

Specifically, the side surface of the housing 1200 that is formed separately into upper part and lower part is respectively formed with an insertion groove 1210 into which the magnet 1500 is inserted.

The magnets 1500 are mounted in these insertion grooves 1210, one in each insertion groove 1210, so that the magnets 1500 are disposed separately into upper and lower sides.

Also, between the magnets 1500 disposed separately into upper and lower sides, the iron piece member 1600 is mounted.

That is, the magnets 1500 are mounted one on each of upper and lower ends of the iron piece 1600.

Also, the magnets 1500 are disposed such that they have the same polarity on the sides abutting to the iron piece member 1600.

That is, if the lower end of the magnet 1500 disposed on the upper side of the iron piece member 1600 is the N pole, the upper end of the magnet 1500 disposed on the lower side of the iron piece member 1600 is also the N pole.

By making the magnets 1500 in contact with the iron piece member 1600 having the same polarity, the magnetic field generated by the magnet 1500 comes to be parallel to the second electromagnetic field generated when the power is applied to the second coil member 1310.

This iron piece member 1600 mounted between the magnets 1500 has a rectangular shape and is made of a ferromagnetic metal material.

Specifically, one end of the iron piece member 1600 is disposed between the magnets 1500, and at this time, it is magnetized as it comes to be in contact with the magnet 1500.

Also, the other end of the iron piece member 1600 is formed projecting toward the holder 1300 and passes through the second coil member 1310 to be adjacent to the first coil member 1410.

That is, the other end of the iron piece member 1600 passes through between the fixing projections 1302 on which the second coil member 131 is inserted and penetratively inserted in the hollow part 1311 of the second coil member 1310, and is adjacent to the first coil member 1410 through the through hole 1301 of the holder 1300, which is communicated with the hollow part 1311.

By penetratively inserting the iron piece member 1600 in the second coil member 1310, it is possible to induce the magnetic field generated by the magnet 1500 to the second coil member 1310 via the iron piece member 1600.

Also, by penetratively inserting the iron piece member 1600 in the through hole 1301 of the holder 1300, it is possible to enable that the iron piece member 1600 passes through the second coil member 1310 to be adjacent to the first coil member 1410.

Meanwhile, the first elastic member 1420 is mounted to the lower end of the lens unit 1400 to elastically support the lens unit 1400 in the up and down direction.

Specifically, the first elastic member 1420 is made of a thin plate parallel to the holder 1300, and the surface of the first elastic member 1420 is coated with a metal material so as to allow flow of electricity.

Also, the first elastic member 1420 includes a first fixation part 1421 fixed to the lens unit 1400, a second fixation part 1422 fixed to the holder 1300 and an elastic part 1423 formed between the first fixation part 1421 and the second fixation part 1422 and contracted and relaxed upon up and down movement of the lens unit 1400.

Also, the first elastic member 1420 is connected with the power terminal 1430 to receive power from the power terminal 1430 to the first coil 1430, and is also electrically connected with the first coil member 1410 to transfer the power applied from the power terminal to the first coil member 1410.

The power terminal 1430 is, on the contrary to the first elastic member 1420, made of a thin plate perpendicular to the holder 1300.

Specifically, the power terminal 1430 includes a first extension part 1431 formed parallel to the outer surface of the holder 1300 and a second extension part 1432 formed bent from the first extension part 1431.

That is, the power terminal 1430 is formed such a shape that a thin plate parallel to the outer surface of the holder 1300 is bent along the outer surface of the holder 1300.

As the power terminal 1430 connected with the first elastic member 1420 includes the second extension part 1432 formed bent from the first extension part 1431 as described above, an angle between the first extension part 1431 and the second extension part 1432 of the power terminal 1430 is decreased or increased upon the horizontal movement of the holder 1300 to minimize the external force applied to the holder 1300 by the power terminal 1430.

Like the lens unit 1400, the holder 1300 is mounted with the second elastic member 1320 that elastically supports the holder 1300 in the horizontal direction.

The second elastic member 1320 is made of a thin and long wire, and an upper end thereof is fixed to the upper side of the housing 1200 and a lower end is mounted to the lower side of the holder 1300.

The second elastic member 1320 is made of metal material through which electricity flows, and is connected with the second coil member 1310 to transfer power to the second coil member 1310.

By connecting the second elastic member 1320 that elastically supports the holder 1300 with the second coil member 1310 and transferring power to the second coil member 1310, it is possible to supply the power to the second coil member 1310 without separate power transfer means and thus reduce the number of parts and facilitate assembly.

Also, the second elastic member 1320 is provided in plural, and is mounted one on each of four symmetric positions of the holder 1300 to support the holder 1300 so that the holder can keep horizon.

At this time, the second elastic member 1320 is connected with the second coil member 1310 mounted on the outer surface of the holder 1300 to transfer the power, and applies the same power to the second coil member 1310 mounted on the outer surface of the holder 1300 such that a pair of the second coils 1310 are opposite to each other.

That is, the same power is applied to two coil members 1310 disposed on the moving line of the holder 1300 upon the horizontal movement of the holder 1300.

By applying the same power to the second coil members 1310, a pair of which is disposed on the outer surface of the holder in opposite to each other, it is possible to apply the force of the same direction to the holder 1300 upon the horizontal movement of the holder 1300 and thus enhance the driving force.

Operation of the photography device in accordance with the embodiment of the present invention constituted as described above will be described in detail.

Figure 4:
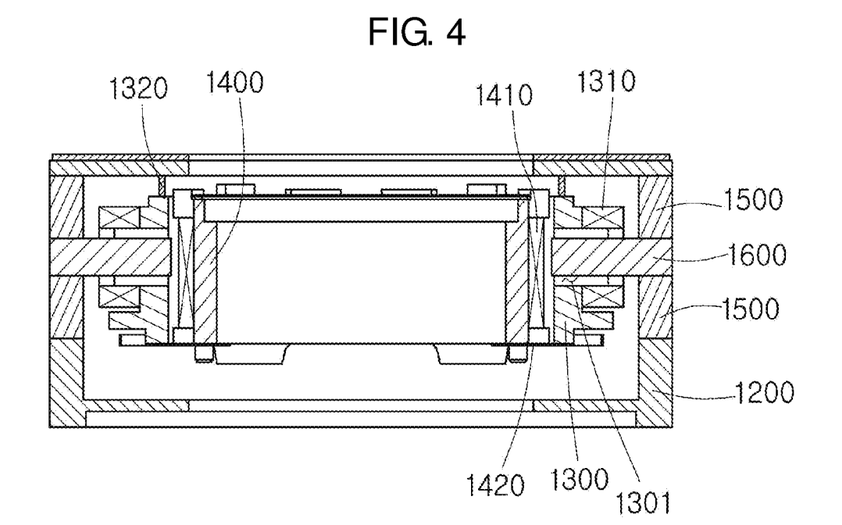
FIGS. 4 to 6 are sectional views taken along a line B-B in FIG. 1.
Figure 5:
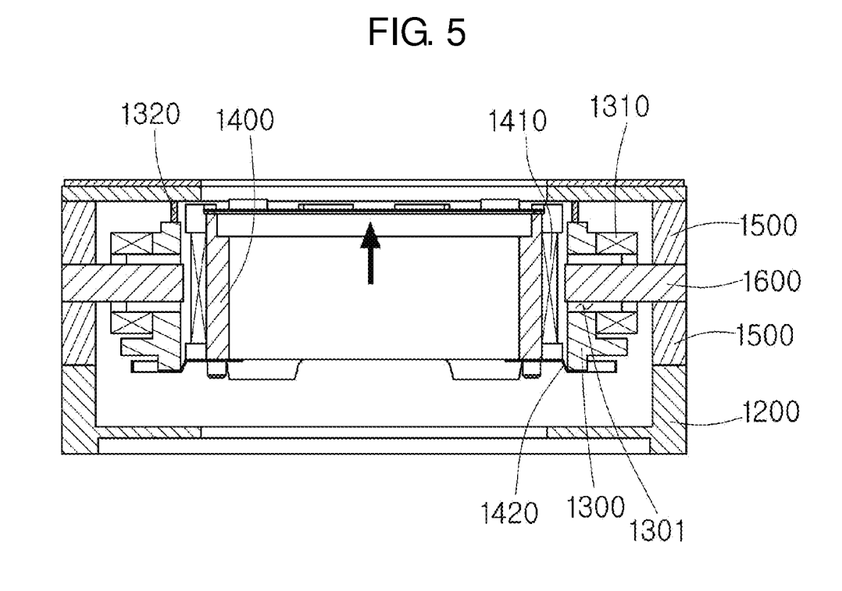
Figure 6:
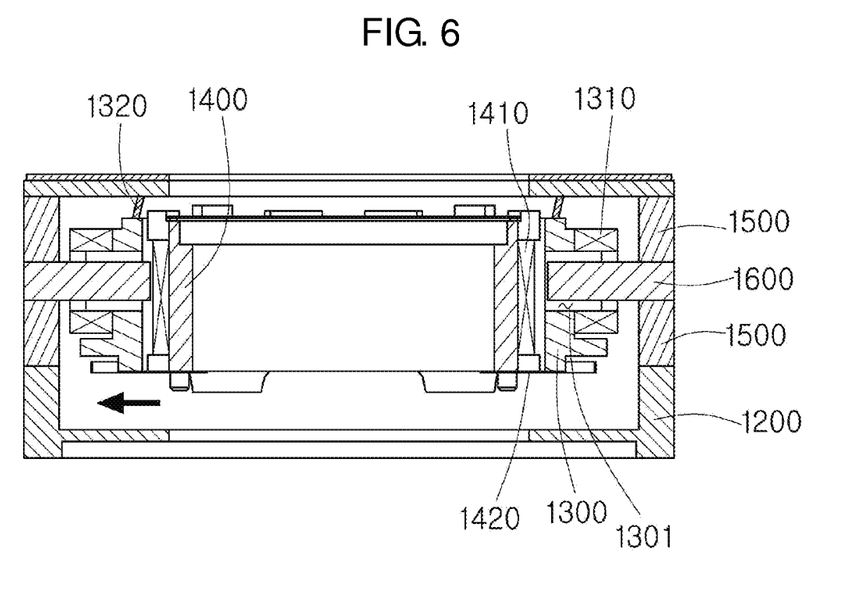
Figure 7:
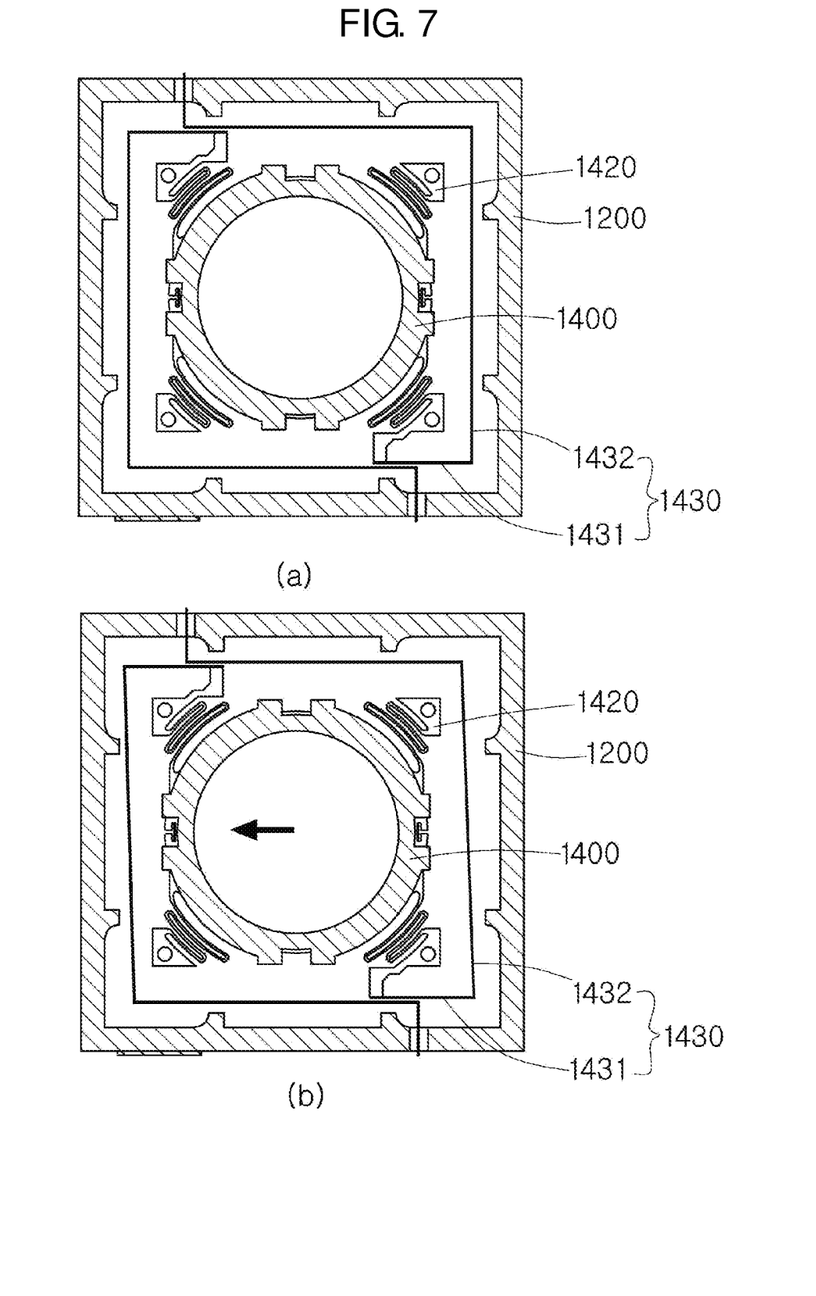
FIG. 7 is a sectional view taken along a line C-C in FIG. 1.

FIGS. 4 to 6 are sectional views taken along a line B-B in FIG. 1; FIG. 7 is a sectional view taken along a line C-C in FIG. 1.

As illustrated in FIG. 4, before the power is applied to the first coil member 1410 and the second coil member 1310, the lens unit 1400 and the holder 1300 are not moved arbitrarily since they are supported by the first elastic member 1420 and the second elastic member 1320.

Also, the first elastic member 1420 keeps the horizontal state and the second elastic member 1320 keeps the vertical state.

FIG. 5 illustrates the operation state when applying power to the first coil member 1410.

As illustrated in FIG. 5, when the power is applied to the first coil member 1410, the first electromagnetic field is formed in the vicinity of the first coil member 1410, and the first electromagnetic field lifts the lens unit 1400 by an interaction with the magnetic field generated in the magnet 1500 and induced through the iron piece 1600.

The lens unit 1400 relaxes the first elastic member 1420 upwardly while it ascends.

At this time, the holder 1300 is supported by the second elastic member 1320 and thus does not ascend.

Meanwhile, if the direction of the power applied to the first coil member 1410 is inversed, the direction of the first electromagnetic field generated in the first coil member 1410 is inversed and the lens unit 1400 descends.

At this time, by the elastic restoring force of the first elastic member 1420, the lens unit 1400 moves to the initial position and is elastically supported so as not to ascend arbitrarily.

FIG. 6 illustrates the operation state when applying power to the second coil member 1310.

As illustrated in FIG. 6, when the power is applied to the second coil member 1310, the second electromagnetic field is formed in the vicinity of the second coil member 1310, and the second electromagnetic field moves the holder 1300 horizontally to the left by an interaction with the magnetic field generated in the magnet 1500 and induced through the iron piece 1600.

The holder 1300 relaxes and leans the second elastic member 1320 to the left while it moves to the left.

Also, the lens unit 1400 and the first elastic member 1420 mounted to the holder 1300 move together horizontally to the left At this time, as illustrated in FIG. 7, the power terminal 1430 connected with the first elastic member 1420 disperses the force so as to minimize the external force which is interfered with the holder 1300 while the angle between the first extension part 1431 and the second extension part 1432 is decreased or increased.

That is, as illustrated in FIG. 7(*a*), the first extension part and the second extension part 1432 are kept to be perpendicular to each other before the holder 1300 moves, and as illustrated in FIG. 7(*b*), the angle between the first extension part 1431 and the second extension part 1432 is decreased or increased to disperse the force when the holder 1300 moves to the left.

By making the magnetic field generated by the magnet 1500 interacting with both the first electromagnetic field and the second electromagnetic field via the iron piece member 1600, it is possible to unify the magnet 1500 for up and down movement of the lens unit 1400 and the horizontal movement of the holder 1300 and thus decrease the number of the elements, facilitates assembly and reduce the overall size.

INDUSTRIAL APPLICABILITY

The photography device with anti-shake function of the present invention is installed in a compact electronic device such as a hand-held device and moves the lens in a direction correcting shake when the shake is generated upon photographing of an object to thereby allow the object to be clearly photographed.

While the present invention has been described with respect to the specific embodiments, it will be apparent to those skilled in the art that various changes and modifications may be made without departing from the spirit and scope of the invention as defined in the following claims.

The invention claimed is:

1. A photography device with a shake-correction structure, comprising:
   a housing;
   a holder mounted inside the housing, the holder being movably mounted in a first direction;
   a lens unit mounted inside the holder, the lens unit being movably in a second direction and including a lens therein, the second direction being substantially perpendicular to the first direction and substantially parallel to an optical axis of the lens;
   a first coil member wound on an outer circumferential surface of the lens unit with respect to the optical axis of the lens;
   a second coil member mounted on a side surface of the holder, the second coil member being wound in a hollow cylindrical shape;
   a magnet mounted to a side surface of the housing; and
   an iron piece member one end of which is in contact with the magnet and the other end of which passes through the hollow second coil member and is disposed adjacently to the first coil member,
   wherein the lens unit moves in the second direction by interaction of a magnetic field generated by the magnet and induced via the iron piece member with a first electromagnetic field generated by the first coil member when power is applied to the first coil member, and the holder moves in the first direction by interaction of the magnetic field generated by the magnet and induced via the iron piece member with a second electromagnetic field generated by the second coil member when power is applied to the second coil member.

2. The photography device of claim 1, wherein the holder includes:
   a through hole penetratively formed in the holder so that an inside and outside of the holder communicates with each other; and
   a fixation projection projecting towards the magnet from both sides of the through hole,
   wherein the second coil member is inserted on the fixation projection and the iron piece member passes through the second coil member between the fixation projections and is penetratively inserted in the through hole.

3. The photography device of claim 1, wherein the magnet is mounted to upper and lower ends of the iron piece member, respectively, and the polarities of the magnets on sides in contact with the iron piece member are the same.

4. The photography device of claim 1, further comprising:
   a first elastic member mounted to the lens unit to elastically support the lens unit in the second direction and electrically connected with the first coil member; and
   a power terminal connected with the first elastic member to transfer power to the first coil member via the first elastic member,
   wherein the power terminal includes a first extension part formed parallel to an outer surface of the holder; and a second extension unit bent from the first extension part.

5. The photography device of claim 1, further comprising:
   a second elastic member having one end mounted to the housing and the other end mounted to the holder to elastically support the holder in the first direction,
   wherein the second elastic member is connected with the second coil member to transfer the power to the second coil member.

6. The photography device of claim 5, wherein the second coil member is provided in plural such that a pair of the second coil members is mounted on the outer surface of the holder facing with each other, and the second elastic member is provided in plural such that the second elastic member applies the same power to the pair of facing second coil members.

* * * * *